(12) United States Patent　(10) Patent No.: US 12,562,603 B2

Maddineni et al.　(45) Date of Patent: Feb. 24, 2026

(54) ELECTROSTATIC SHIELD FOR WIRELESS SYSTEMS

(71) Applicant: Apple Inc., Cupertino, CA (US)

(72) Inventors: Prudhvi Mohan Maddineni, Cupertino, CA (US); Vijay G. Phadke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 727 days.

(21) Appl. No.: 17/941,737

(22) Filed: Sep. 9, 2022

(65) Prior Publication Data

US 2023/0093369 A1　Mar. 23, 2023

Related U.S. Application Data

(60) Provisional application No. 63/245,474, filed on Sep. 17, 2021.

(51) Int. Cl.
| | |
|---|---|
| *H02J 50/70* | (2016.01) |
| *H01F 27/28* | (2006.01) |
| *H02J 50/00* | (2016.01) |
| *H02J 50/10* | (2016.01) |

(52) U.S. Cl.
CPC ............ *H02J 50/70* (2016.02); *H01F 27/288* (2013.01); *H02J 50/005* (2020.01); *H02J 50/10* (2016.02)

(58) Field of Classification Search
CPC .......... H02J 50/70; H02J 50/005; H02J 50/10; H01F 27/288; H01F 27/36; H01F 27/366; H01F 27/2871; H01F 27/2885; H01F 38/14; H01F 27/363

USPC ......................................................... 320/108
See application file for complete search history.

(56) References Cited

U.S. PATENT DOCUMENTS

| | | | |
|---|---|---|---|
| 2017/0084991 A1* | 3/2017 | Mayo | ....................... H01F 27/36 |
| 2017/0187220 A1 | 6/2017 | Rosenfeld et al. | |
| 2019/0164729 A1 | 5/2019 | Mopidevi et al. | |
| 2021/0065965 A1 | 3/2021 | Jadidian et al. | |

FOREIGN PATENT DOCUMENTS

| | | |
|---|---|---|
| CN | 209860908 U | 12/2019 |
| CN | 111434022 A | 7/2020 |
| IN | 201817031493 A | 3/2019 |
| KR | 2018-0094475 A | 8/2018 |
| KR | 2020-0017071 A | 2/2020 |
| KR | 2020-0084367 A | 7/2020 |

* cited by examiner

*Primary Examiner* — Paul Dinh

(74) *Attorney, Agent, or Firm* — BakerHostetler

(57)　ABSTRACT

The described shielding system comprises a first shield and a second shield. The first shield comprises a first plurality of conductive segments extending from a first location. The first plurality of conductive segments are separated from each other by a first plurality of gaps. The second shield comprises a second plurality of conductive segments extending from a second location. The second plurality of conductive segments are separated from each other by a second plurality of gaps. An insulator may be interposed between the first shield and the second shield. The first plurality of gaps may at least partially align with the second plurality of conductive segments and the second plurality of gaps may at least partially align with the first plurality of conductive segments.

9 Claims, 13 Drawing Sheets

1200

100

106a-n          102a-n

104

102b

200

300

302

400

402

500

502

600

602

700

702

800

900

1000

1100

1102

1104

1200

1206

1202

1204

ELECTROSTATIC SHIELD FOR WIRELESS SYSTEMS

PRIORITY

The disclosure claims the benefit under 35 U.S.C. § 119(e) of U.S. Provisional Patent Application No. 63/245,474 entitled "Electrostatic Shield for Wireless Systems", filed on Sep. 17, 2021, which is incorporated herein by reference in its entirety.

TECHNICAL BACKGROUND

The present disclosure relates generally to wireless charging, and more particularly, to a shield for wireless power transfer systems.

BACKGROUND

Wireless charging is useful for battery-powered portable devices. Some wireless systems can produce electromagnetic interference (EMI). Shields are used to mitigate some of this EMI. Shield performance may vary depending on coupling between the receiver and transmitter coils during wireless power operations.

SUMMARY

In a first aspect, the disclosed embodiments provide for a system for electrostatic shielding. The system includes a first shield, a second shield, and an insulator interposed between the first shield and the second shield. The first shield may include a first plurality of conductive segments extending from a first location. The first plurality of conductive segments may be separated from each other by a first plurality of gaps. The second shield may include a second plurality of conductive segments extending from a second location. The second plurality of conductive segments may be separated from each other by a second plurality of gaps. The first plurality of gaps may be configured to at least partially align with the second plurality of conductive segments. The second plurality of gaps may be configured to at least partially align with the first plurality of conductive segments.

In a second aspect, a wireless charging device includes a power coil, a shield positioned on a bottom surface of the power coil, and an insulator positioned between the power coil and the shield. The power coil may include a conductive wire wound in a plurality of turns about a center point and in increasing radii such that the power coil is substantially planar. The shield may include a plurality of conductive segments extending radially from a location. The plurality of conductive segments may be separated from each other by a plurality of gaps.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A portable electronic device is an electronic device that can operate without being coupled to a power grid by running on its own locally stored electrical power. Portable electronic devices may wirelessly receive power from a wireless charging device. A portable electronic device may comprise a receiver coil and a wireless charging device may comprise a transmitter coil. During wireless power transfer from the wireless charging device to the portable electronic device, the receiver coil may receive power by interacting with a time-varying magnetic flux generated by the transmitter coil.

Wireless power transfer systems produce electromagnetic signals, portions of which may be seen as electromagnetic interference (EMI) by other devices. Shields may be used to mitigate EMI. For example, a pair of shields may be utilized, with one shield on the receiver side connected to primary ground and the other shield on the transmitter side connected to secondary ground. However, shield performance can vary due to coupling variations between transmitter and receiver. For example, when a wireless power receiver and transmitter are poorly coupled, a voltage imbalance may exist between the receiver shield and the transmitter shield. Such a voltage imbalance may reduce shielding performance. Shield improvements that improve EMI mitigation across operating conditions are desirable.

The disclosed technology addresses the foregoing limitations of conventional shields for wireless systems by introducing a shield comprising a plurality of conductive segments extending from a location. The plurality of conductive segments are separated from each other by a plurality of gaps. A pair of such shields may be utilized in a wireless system, with a first shield on the receiver side connected to primary ground and a second shield on the transmitter side connected to secondary ground. The shields in the system may be configured so that the plurality of gaps associated with the first shield are configured to at least partially align with the plurality of conductive segments associated with the second shield and the plurality of gaps associated with the second shield are configured to at least partially align with the plurality of conductive segments associated with the first shield, thereby improving the shielding ability of the system.

Figure 1:
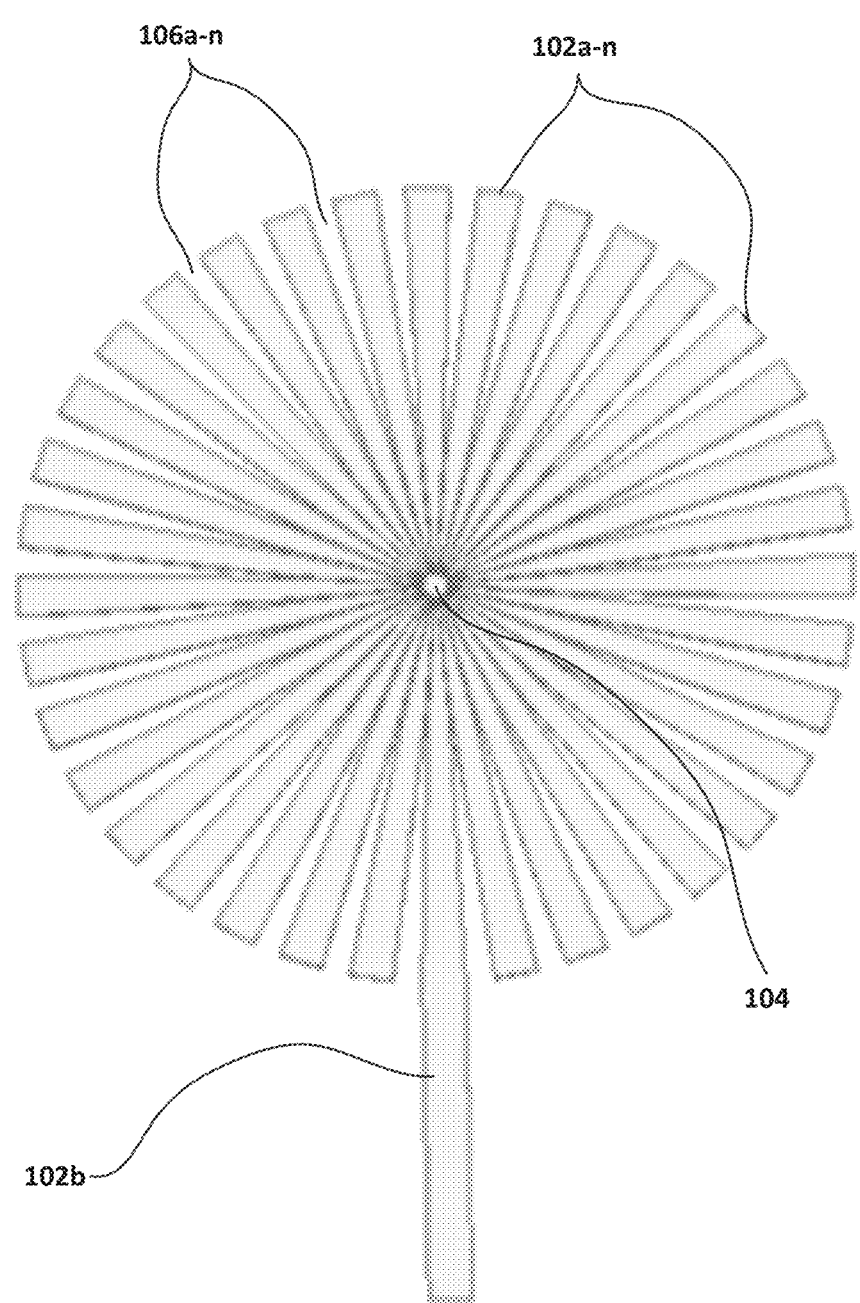
FIG. 1 illustrates a shield, in accordance with an aspect of the disclosure.

In some embodiments, a portable electronic device is bidirectional, in that the device is able to both operate in a receive mode or a transmit mode. For brevity, the disclosed shielding technology is described herein with reference to wireless transmitters and receivers. However, it should be appreciated that some wireless transceivers are bidirectional and can incorporate the described shields FIG. 1 illustrates a shield 100. The shield 100 may comprise a plurality of conductive segments 102*a-n* extending from a location 104. The plurality of conductive segments 102*a-n* may be a material selected from copper, aluminum, lead, zinc, tin, gold, silver, and a combination thereof.

The location 104 may be, for example, a conductive center point of the shield 100. Alternatively, the location 104 may be a conductive point located proximate to the center of the shield 100 or a conductive point located proximate to a perimeter of the shield 100. For example, the location 104 may be a conductive point positioned at a peripheral point of the shield 100. The location 104 may be a filled circular point or may instead comprise a conductive ring. The location 104 may comprise a material selected from copper, aluminum, lead, zinc, tin, gold, silver, and a combination thereof. For example, the location 104 may be a filled copper circle. If the location 104 is a filled circle, a radius of the filled circle may be as small as possible in light of manufacturing methods/materials and/or tolerances.

The shield 100 may have a substantially circular shape. The plurality of conductive segments 102*a-n* may extend radially outward from the location 104.

At least one of the plurality of conductive segments 102*a-n*, such as the conductive segment 102*b*, may be connectable to an electrical ground of a charging device or a portable electronic device. The conductive segment 102*b* may have a greater length than the remainder of the plurality of conductive segments 102*a-n* do. For example, the conductive segment 102*b* may comprise additional conductive material connecting the conductive segment 102*b* to an electrical ground of the wireless charging device or the portable electronic device.

The plurality of conductive segments 102*a-n* may be separated from each other by a plurality of gaps 106*a-n*. A width of the plurality of gaps 106*a-n* may be less than a width of the plurality of conductive segments 102*a-n*, so that each of the plurality of conductive segments 102*a-n* are wider than each of the plurality of gaps 106*a-n*.

In some variations, thinner shield material may reduce eddy current losses created by the varying magnetic field of the energized coils. The shield 100 may have a thickness in the nanometer or micro-meter range, such as in portable electronic devices, but thicker shields may also function with a balance in efficiency. Thinner shield material may save space and materials cost.

Figure 2:
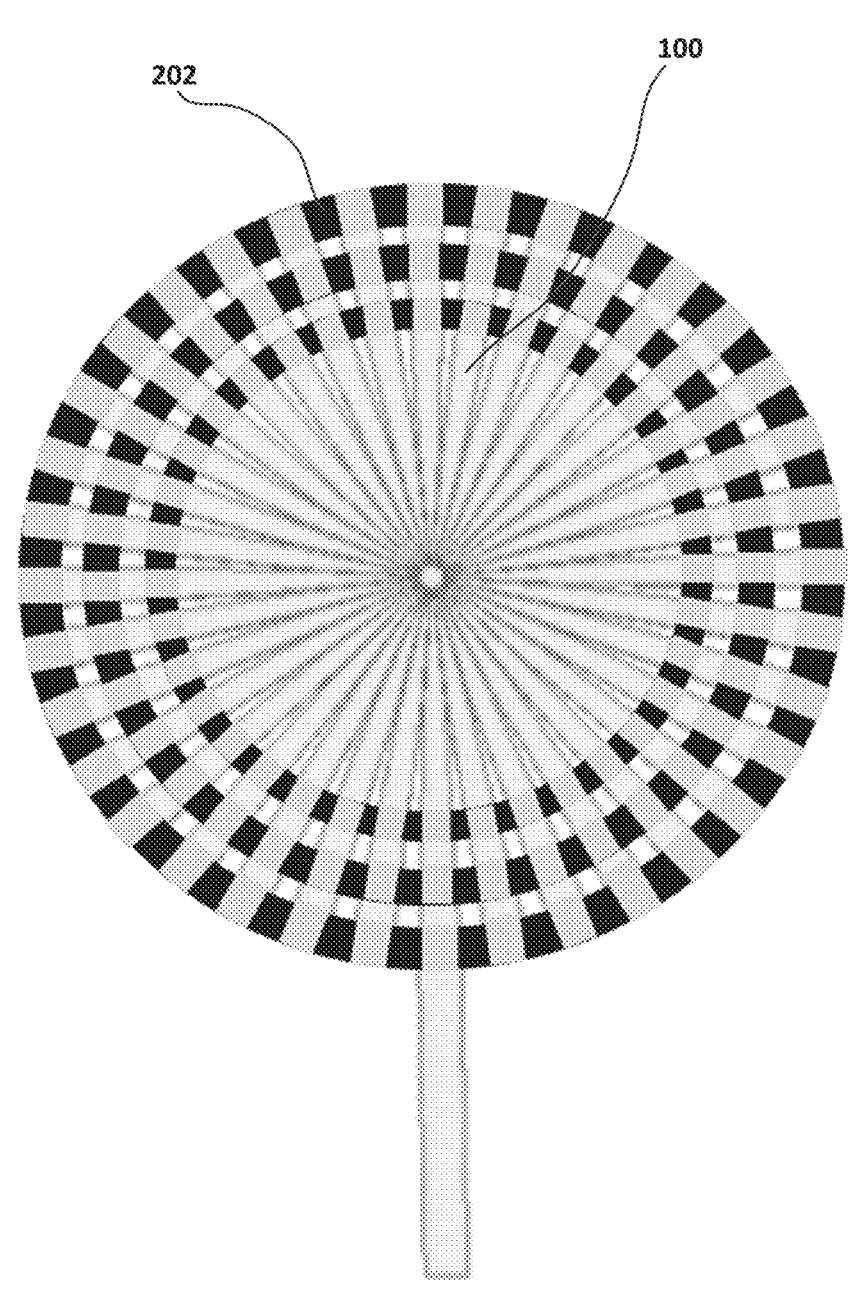
FIG. 2 illustrates a shield positioned on a surface of a power coil, in accordance with an aspect of the disclosure.

FIG. 2 illustrates a shield system 200. The system 200 comprises a shield, such as the shield 100 of FIG. 1, positioned on a surface of a power coil 202. The power coil 202 may comprise a conductive wire wound in a plurality of turns about a center point and in increasing radii such that the coil is substantially planar.

The power coil 202 may be a transmitter coil, such as a transmitter coil that is part of a wireless charging device. If the power coil 202 is a transmitter coil, the shield may be positioned on a bottom surface of the power coil 202. The power coil 202 may be configured to a time-varying magnetic flux capable of generating a corresponding current in a receiver coil, such as a receiver coil that is part of a portable electronic device. The generated current can be utilized by the portable electronic device to charge a battery of the portable electronic device.

Alternatively, the power coil 202 may be a receiver coil, such as a receiver coil that is part of a portable electronic device. If the power coil 202 is a receiver coil, the shield may be positioned on a top surface of the power coil 202. If the power coil 202 is a receiver coil, the power coil 202 may receive power from the wireless charging device, such as when the portable electronic device is placed on or nearby the wireless charging device. For example, the power coil 202 may be coupled to charging circuitry that is configured to operate the power coil 202 to wirelessly receive power.

In an embodiment, a center of the power coil 202 may comprise a circular opening having a radius. If the center of the power coil 202 comprises a circular opening having a radius, the location on the shield from which the plurality of conductive segments extend may comprise a conductive point (e.g. conductive point, conductive ring, etc.) positioned within the circular opening when the shield is positioned on a surface of the power coil 202.

Figure 3:
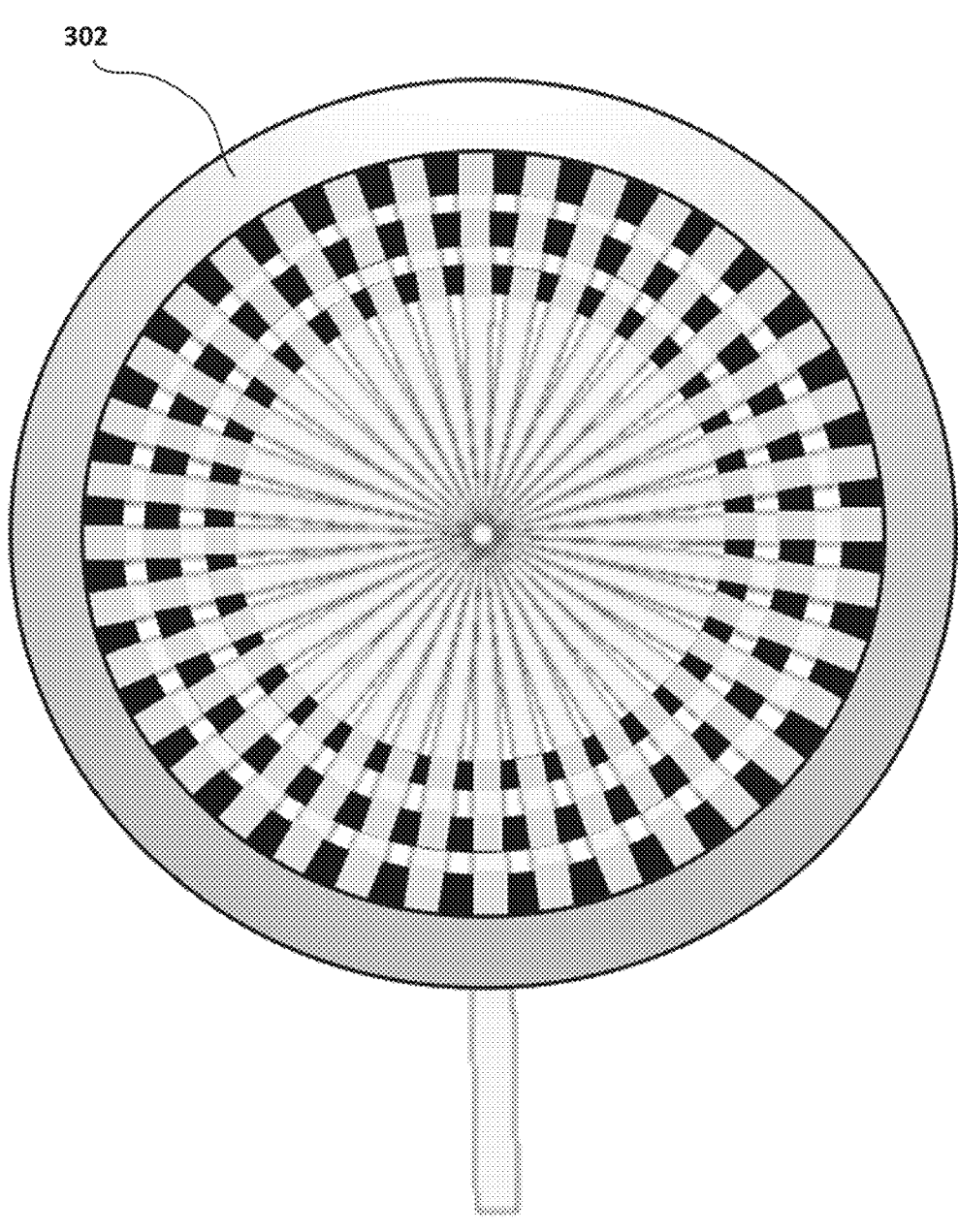
FIG. 3 illustrates a shield positioned on a surface of a power coil and a base positioned on an opposite surface of the power coil, in accordance with an aspect of the disclosure.

FIG. 3 illustrates a shield system 300. The system 300 comprises a shield, such as the shield 100 of FIG. 1, positioned on a surface of a power coil, such as the power coil 202 of FIG. 2. The system 300 comprises a base 302 positioned on a surface of the power coil. The base 302 may be, for example, a material comprising a ferrite material. The base 302 may have a greater thickness than the shield and/or the power coil. The base 302 may have a diameter that is larger than the diameter of the shield and/or the power coil.

Figure 4:
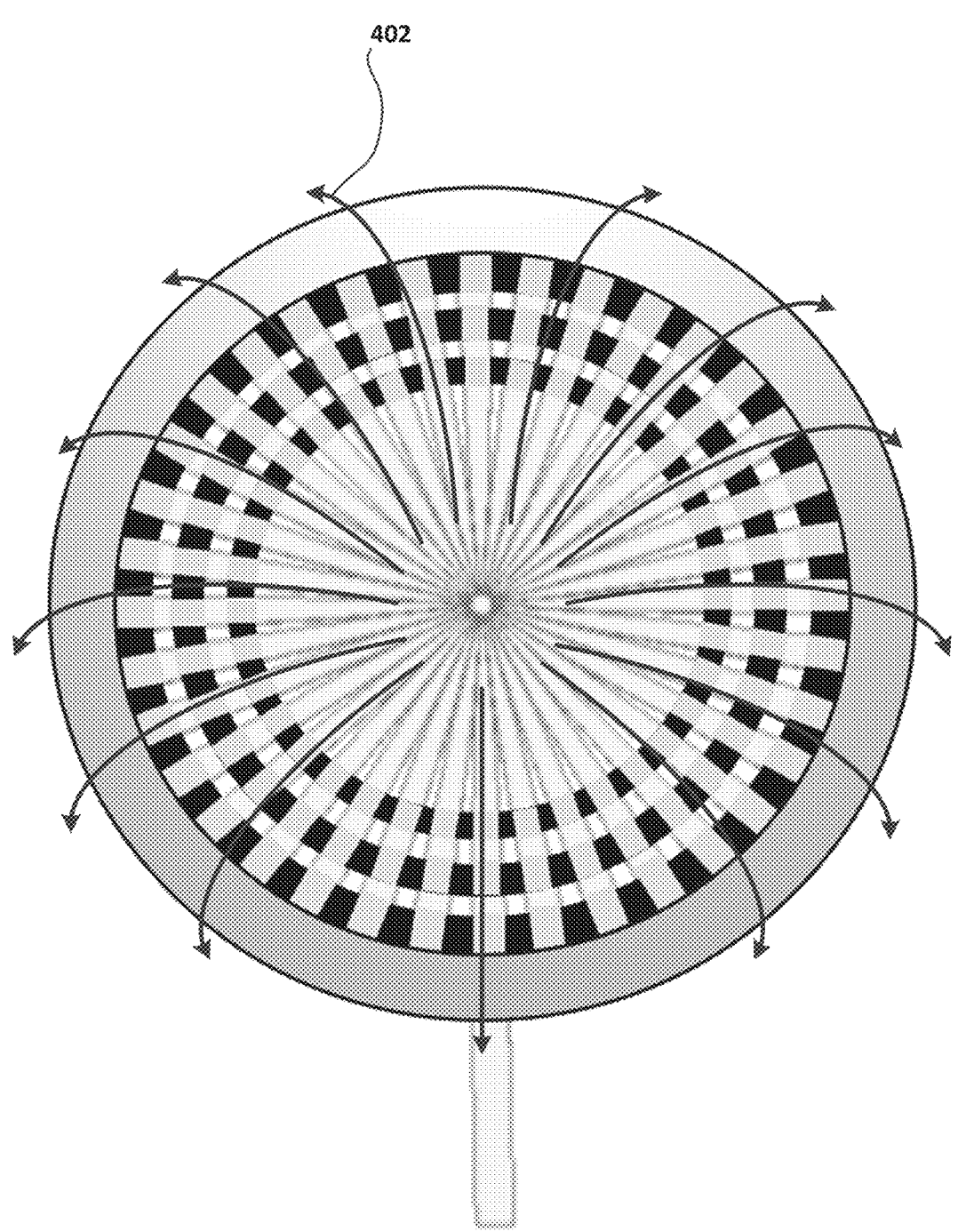
FIG. 4 illustrates a shield exposed to a magnetic field, in accordance with an aspect of the disclosure.

The base 302 may be positioned on an opposite side of the power coil from the shield. For example, if the shield is positioned on a top surface of the power coil, the base 302 may be positioned on a bottom surface of the power coil. Likewise, if the shield is positioned on a bottom surface of the power coil, the base 302 may be positioned on a top surface of the power coil FIG. 4 illustrates a shield system 400. The shield system 400 comprises a shield, such as the shield 100 of FIG. 1, positioned on a surface of a power coil, such as the power coil 202 of FIG. 2, and a base 302 positioned on an opposite surface of the power coil. The power coil may generate a magnetic field 402. The magnetic field 402 may comprise flux lines having a direction extending outwards from the location (e.g. location 104) from which the conductive segments of the shield extend. For example, if the location is a central location of the shield, and the conductive segments extend radially outwards from the location, the flux lines may have a direction extending radially outwards from the location.

Figure 5:
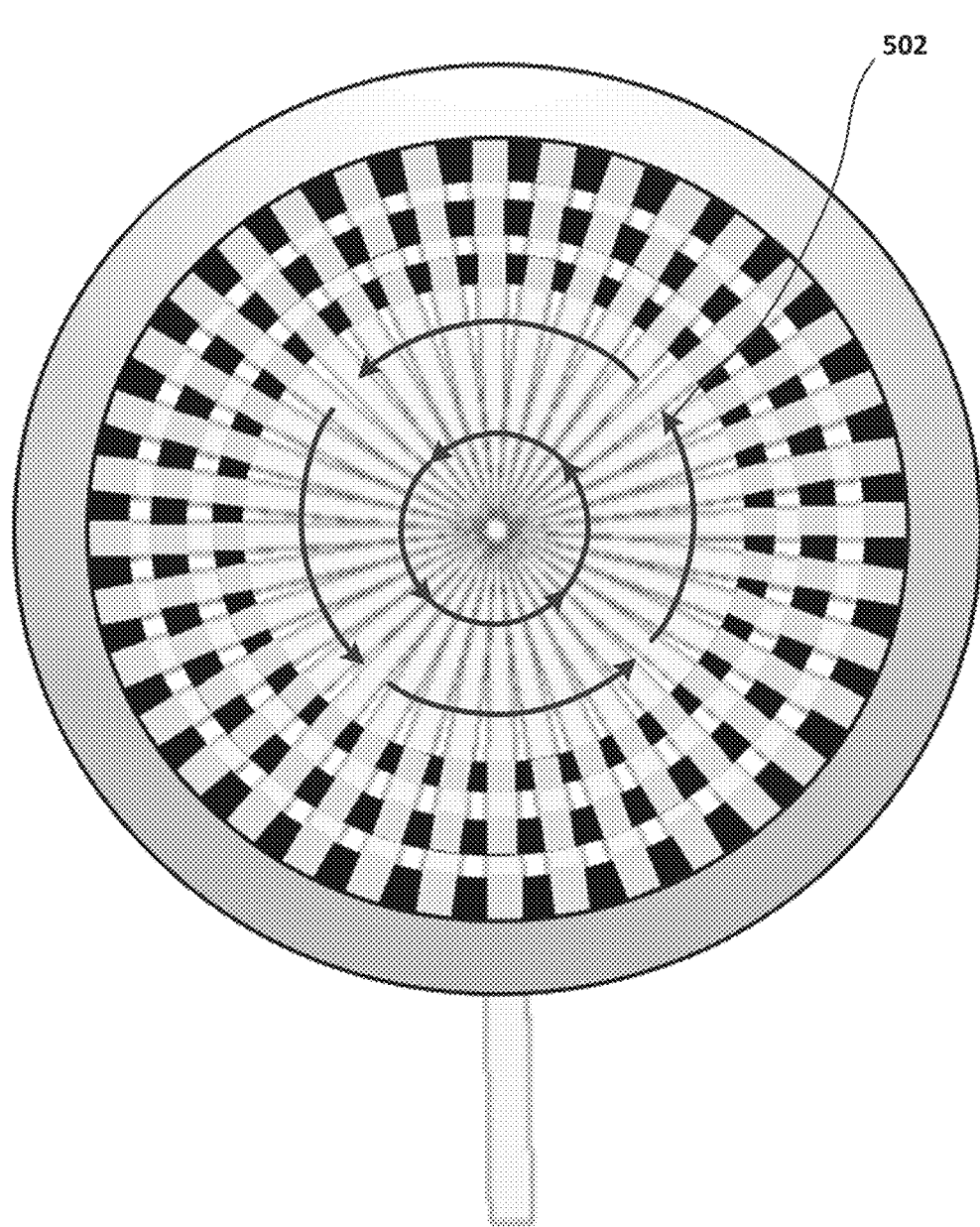
FIG. 5 illustrates a shield exposed to an electric field, in accordance with an aspect of the disclosure.

FIG. 5 illustrates a shield system 500. The shield system 500 comprises a shield, such as the shield 100 of FIG. 1, positioned on a surface of a power coil, such as the power coil 202 of FIG. 2, and a base 302 positioned on an opposite surface of the power coil. As discussed above with reference to FIG. 4, the power coil may generate a magnetic field (e.g. magnetic field 402).

The magnetic field may induce an electric field 502. The direction of the magnetic field may determine the direction of the electric field 502. As discussed above, the magnetic field may comprise flux lines having a direction extending outwards from a central location of the shield. Accordingly, using the right-hand rule, the electric field 502 may have a circular direction.

Figure 6:
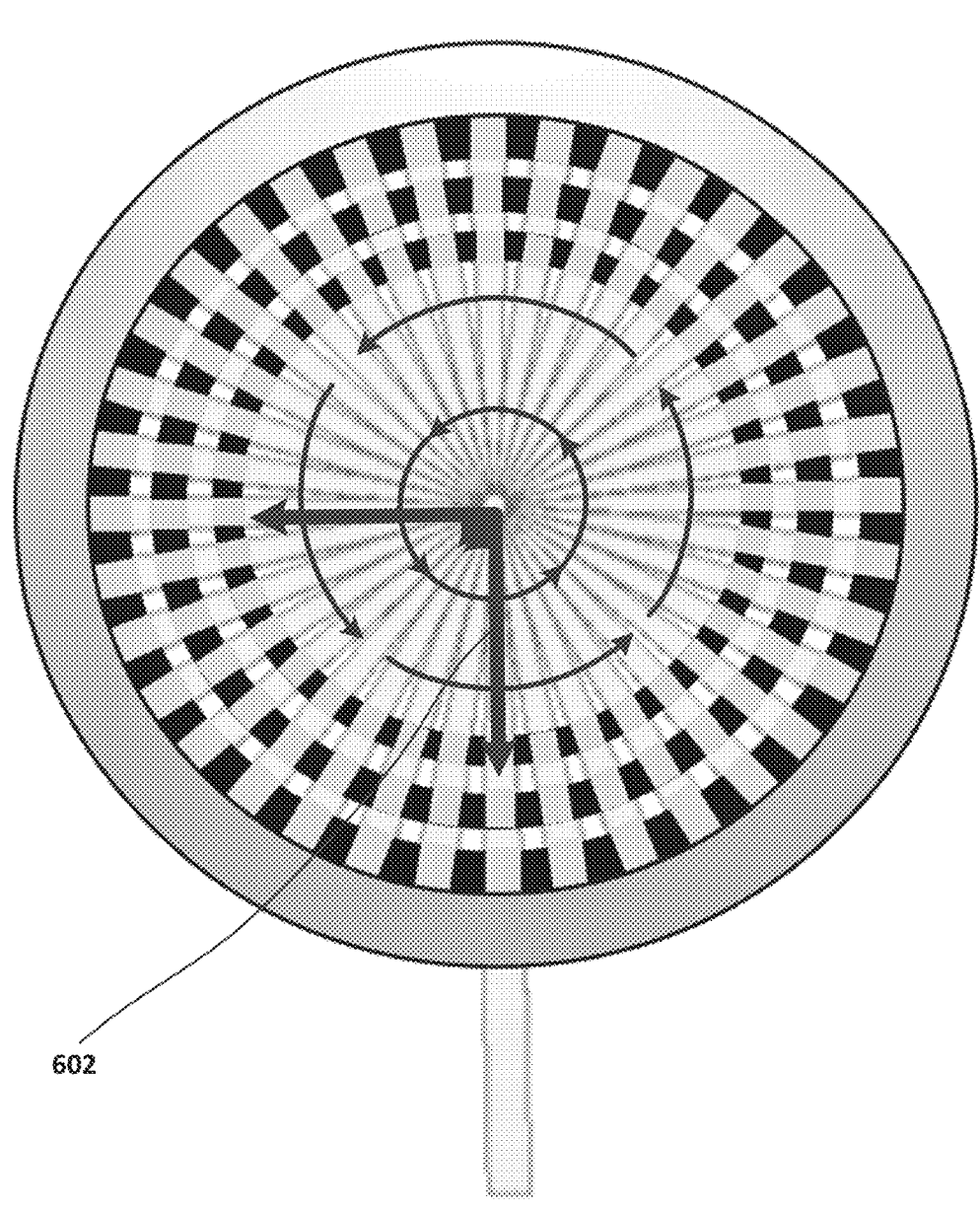
FIG. 6 illustrates an electric field intersecting each conductive segment of a shield substantially perpendicularly, in accordance with an aspect of the disclosure.

The direction of the induced electric field, 502 may, at each point of the electric field 502, be substantially perpendicular to at least one of the plurality of conductive segments. FIG. 6 illustrates a shield system 600. The shield system 600 comprises a shield, such as the shield 100 of FIG. 1, positioned on a surface of a power coil, such as the power coil 202 of FIG. 2, and a base 302 positioned on an opposite surface of the power coil. As discussed above with reference to FIGS. 4-5, the power coil may generate a magnetic field (e.g., magnetic field 402). The magnetic field may induce an electric field (e.g., electric field 502). The electric field 502 may have a circular direction. At each point on the shield, the electric field 502 may have a direction that is substantially perpendicular to at least one of the conductive segments, as indicated by the perpendicular indicator 602. Accordingly, the conduction path of electricity is perpendicular to the electric field 502 at each point of the electric field 502.

Figure 7:
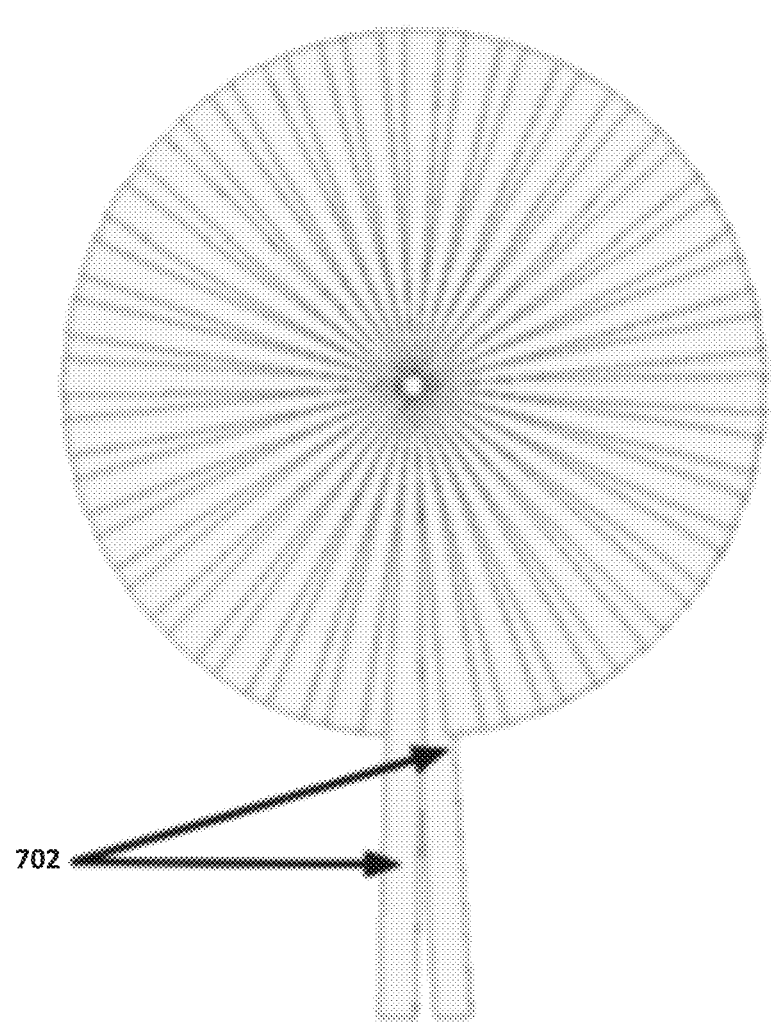
FIG. 7 illustrates a system including overlapping shields, in accordance with an aspect of the disclosure.

FIG. 7 illustrates a system 700 comprising overlapping shields. The system 700 may comprises a pair of shields, such as a pair of the shields 100 discussed above with reference to FIG. 1. The pair of shields may comprise a first shield and a second shield. The first shield may comprise a first plurality of conductive segments extending from a first location. The first plurality of conductive segments may be separated from each other by a first plurality of gaps. The second shield may comprise a second plurality of conductive segments extending from a second location. The second plurality of conductive segments may be separated from each other by a second plurality of gaps. The first and second shields may be, for example, identical to each other.

In some examples, the first shield is positioned on a bottom surface of a transmitter power coil, such as a transmitter power coil in a wireless charging device. In some examples, the second shield is positioned on a top surface of a receiver power coil, such as a receiver power coil in a portable electronic device. In some examples, the combination of first and second shields are positioned on the transmitter power coil in a wireless charging device. In some examples, the combination of first and second shields are positioned on the receiver power coil in a portable electronic device. The first and second shields may be configured so that they are both positioned between the receiver power coil and the transmitted power coil when the portable wireless device is receiving power from (e.g. placed on top of) the wireless charging device. Insulation material may be interposed between the first and second shields.

When the portable wireless device is configured to receive power from (e.g. placed on top of) the wireless charging device, the first plurality of gaps may be configured to at least partially align (e.g. overlap) with the second plurality of conductive segments. Likewise, the second plurality of gaps may be configured to at least partially align (e.g. overlap) with the first plurality of conductive segments. The first plurality of conductive segments may have a greater width than the second plurality of gaps does. Likewise, the second plurality of conductive segments may have a greater width than the first plurality of gaps does. Such a configuration ensures that both the receiver and transmitter power coils are fully shielded.

As discussed above, in some variations, thinner shield material may reduce eddy current losses created by the varying magnetic field of the energized coils. The shields may have a thickness in the nanometer or micro-meter range, but thicker shields may also function with a balance in efficiency. Thinner shield material may save space and materials cost.

For example, a two-layer shield system as described above, made up of a pair of 5 micrometer thick layers, would have relatively lower eddy current losses than the same system made up of a pair of 15 micrometer thick layers (although the pattern of the shields remains the same). Design engineers may balance materials thinness, e.g., strength, with thickness and, e.g., cost.

Figure 8:
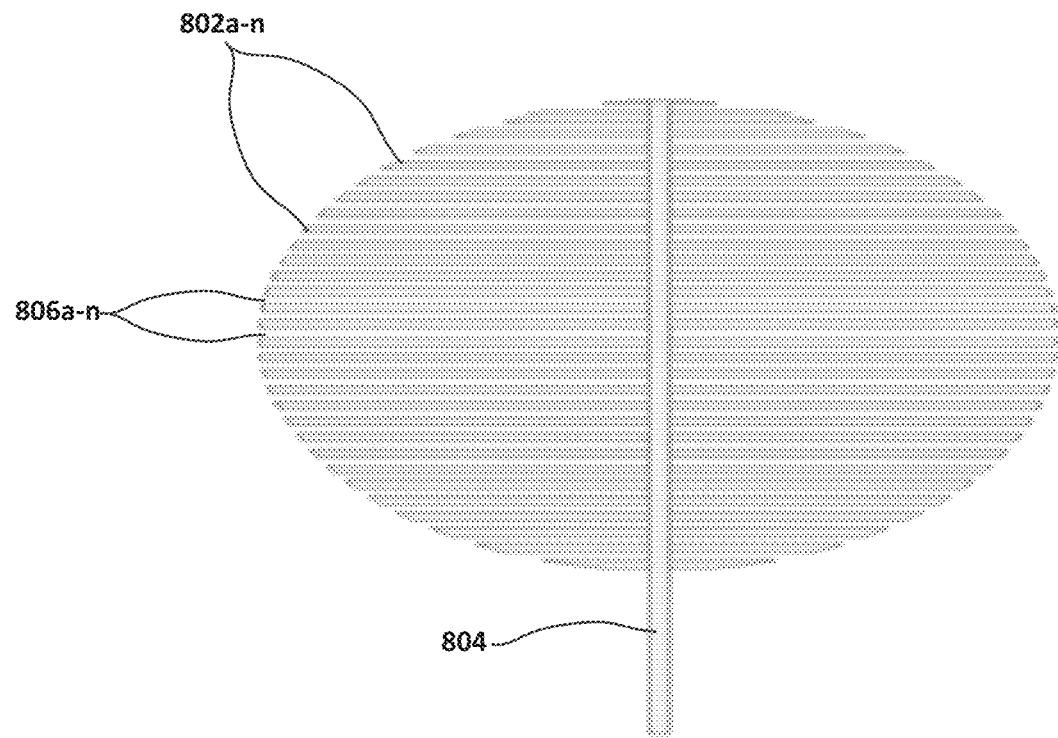
FIG. 8 illustrates an alternative embodiment of a shield, in accordance with an aspect of the disclosure.

FIG. 8 illustrates an alternative embodiment of a shield 800. The shield 800 may be utilized in place of the shield 100 in any of the systems described above with reference to FIGS. 2-7. The shield 800 may comprise a plurality of conductive segments 802a-n extending from a location 804. The plurality of conductive segments 802a-n may be a material selected from copper, aluminum, lead, zinc, tin, gold, silver, and a combination thereof.

In some variations, thinner shield material may reduce eddy current losses created by the varying magnetic field of the energized coils. The shield 800 may have a thickness in the nanometer or micro-meter range, such as in portable electronic devices, but thicker shields may also function with a balance in efficiency.

The location 804 may be, for example, a conductive vertical bar or line down a center of the shield 800. The location 804 may be connectable to an electrical ground of a charging device or a portable electronic device. The location 804 may comprise a material selected from copper, aluminum, lead, zinc, tin, gold, silver, and a combination thereof.

The shield 800 may have a substantially circular or oval shape. The plurality of conductive segments 802a-n may extend horizontally outward from the location 804. The plurality of conductive segments 802a-n may be separated from each other by a plurality of gaps 806a-n. A width of the plurality of gaps 806a-n may be less than a width of the plurality of conductive segments 802a-n, so that each of the plurality of conductive segments 802a-n are wider than each of the plurality of gaps 806a-n.

Figure 9:
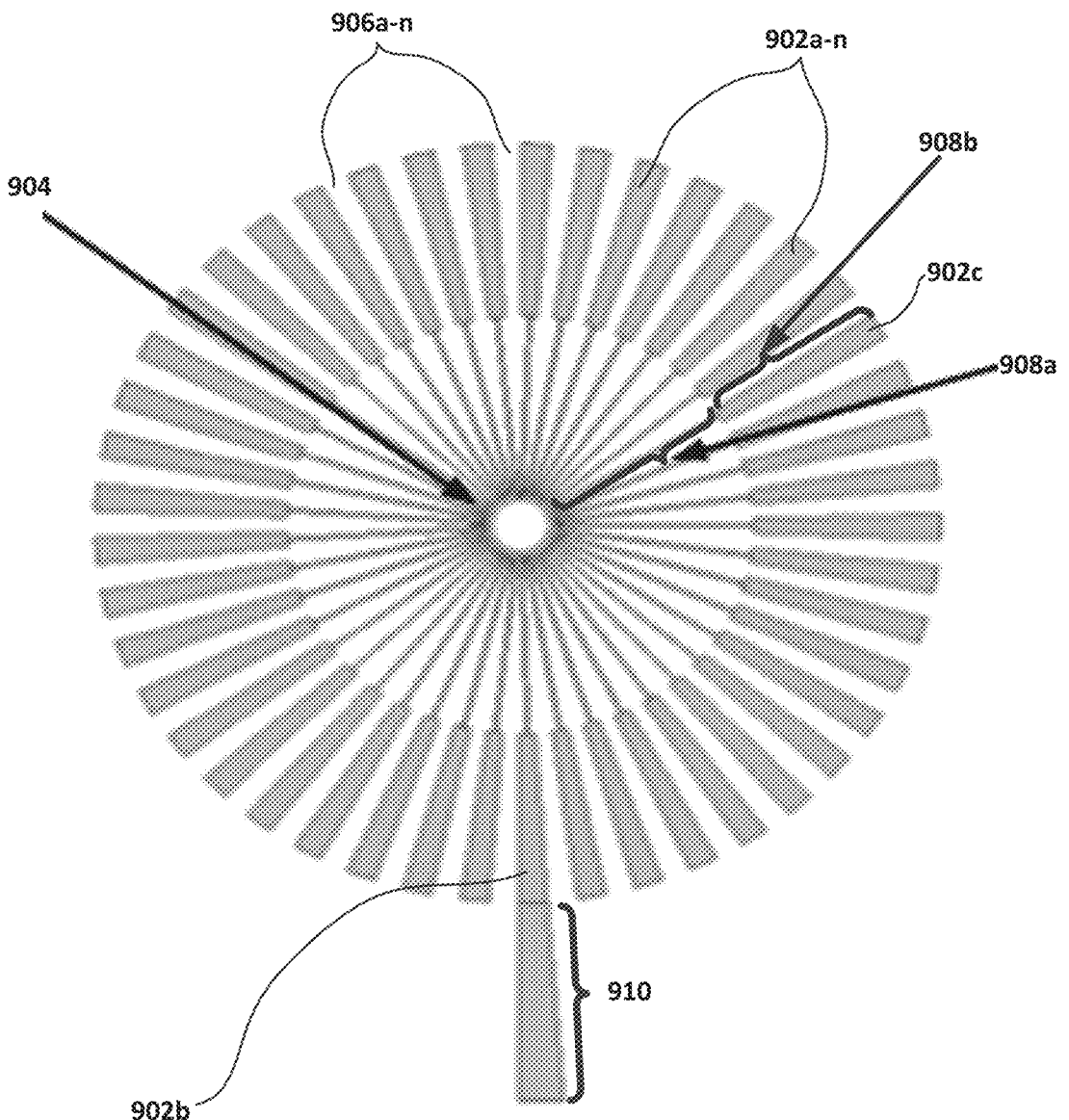
FIG. 9 illustrates an alternative embodiment of a shield, in accordance with an aspect of the disclosure.

FIG. 9 illustrates an alternative embodiment of a shield 900. The shield 900 may be utilized in place of the shield 100 in any of the systems described above with reference to FIGS. 2-7. The shield 900 may comprise a plurality of conductive segments 902a-n extending from a location 904. The plurality of conductive segments 902a-n may be a material selected from copper, aluminum, lead, zinc, tin, gold, silver, and a combination thereof.

In some variations, thinner shield material may reduce eddy current losses created by the varying magnetic field of the energized coils. The shield 900 may have a thickness in the nanometer or micro-meter range, such as in portable electronic devices, but thicker shields may also function with a balance in efficiency.

The location 904 may be, for example, a conductive center point of the shield 900. Alternatively, the location 904 may be a conductive point located proximate to the center of the shield 900 or a conductive point located proximate to a perimeter of the shield 900. The location 904 may be a filled circular point or may instead comprise a conductive ring. The location 904 may comprise a material selected from copper, aluminum, lead, zinc, tin, gold, silver, and a combination thereof.

The shield 900 may have a substantially circular or oval shape. The plurality of conductive segments 902a-n may extend radially outward from the location 904.

The plurality of conductive segments 902a-n may be separated from each other by a plurality of gaps 906a-n. At least one of the plurality of conductive segments 902a-n, such as the conductive segment 902b, may be connectable to an electrical ground of a charging device or a portable electronic device. The conductive segment 902b may have a greater length than the remainder of the plurality of conductive segments 902a-n. For example, conductive segment 902b may comprise additional conductive material 910 connecting the conductive segment 902b to an electrical ground of the wireless charging device or the portable electronic device.

Each conductive segment of the plurality of conductive segments 902a-n may comprise a first portion having a first width and a first length and a second portion having a second width and a second length. The second length may be equal to a radius of the shield 900 less the first length. The first portion may be closer than the second portion to the first location. The first width may be smaller than the second width. For example, the conductive segment 902c comprises a first portion 908a and a second portion 908b. The first portion 908a is closer to the location 904 than the second portion 908b is. The first portion 908a has a smaller width than the second portion 908b. The length of the second portion 908b is equal to a radius of the shield 900 less the length of the first portion 908a.

The shield 900 may be utilized in a system with a power coil (e.g. power coil 202), such as in the system 200 described above. For example, the shield 900 may be positioned on a top or bottom surface of the power coil. A center of the power coil may comprise a circular opening having a radius. If the center of the power coil comprises a circular opening having a radius, the location 904 may comprise a conductive point (e.g. filled circular point or conductive ring) positioned within the circular opening when the shield 900 is positioned on a surface of the power coil.

The length of the first portion of the plurality of conductive segments 902a-n may be substantially equal to a radius of the circular opening so that the first portion of each conductive segment of the plurality of conductive segments 902a-n is not shielding the power coil. The smaller width of the first portion of the plurality of conductive segments 902a-n reduces the surface area of the portion of the shield 900 that is not actually shielding the power coil but is still exposed to the magnetic field generated by the power coil (e.g. magnetic field 402). By reducing the surface area of the portion of the shield 900 that is not shielding the power coil but is still exposed to the magnetic field, eddy current losses are mitigated.

A width of the plurality of gaps 906a-n may be less than a width of the plurality of conductive segments 902a-n, so that each of the plurality of conductive segments 902a-n are wider than each of the plurality of gaps 906a-n. For example, a width of the plurality of gaps 906a-n may be less than a width of the second portion of the plurality of conductive segments 902a-n, such as a width of the second portion 908b of the conductive segment 902c.

Figure 10:
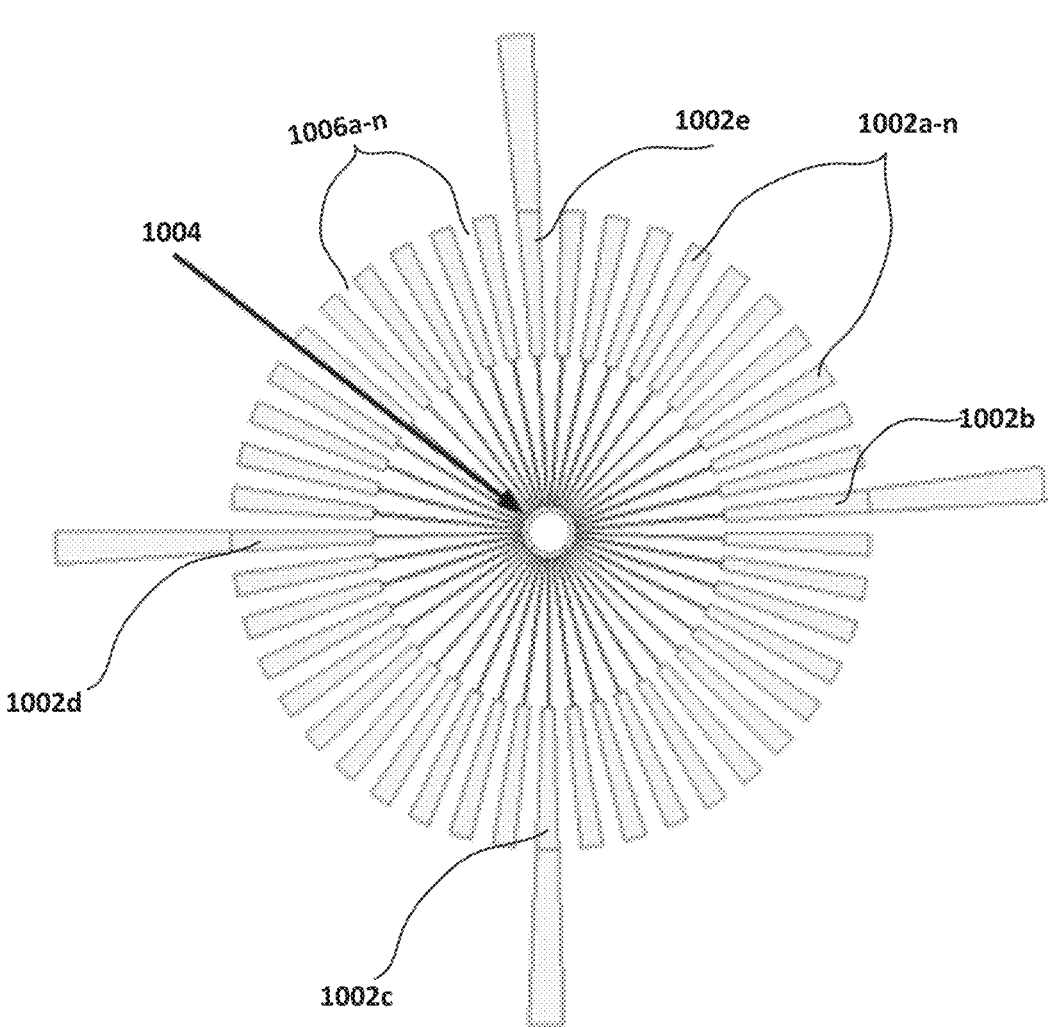
FIG. 10 illustrates another alternative embodiment of a shield, in accordance with an aspect of the disclosure.

FIG. 10 illustrates an alternative embodiment of a shield 1000. The shield 1000 may be utilized in place of the shield 100 in any of the systems described above with reference to FIGS. 2-7. The shield 1000 may comprise a plurality of conductive segments 1002a-n extending from a location 1004. The plurality of conductive segments 1002a-n may be a material selected from copper, aluminum, lead, zinc, tin, gold, silver, and a combination thereof.

The location 1004 may be, for example, a conductive center point of the shield 1000. Alternatively, the location 1004 may be a conductive point located proximate to the center of the shield 1000 or a conductive point located proximate to a perimeter of the shield 1000. The location 1004 may be a filled circular point or may instead comprise a conductive ring. The location 1004 may comprise a material selected from copper, aluminum, lead, zinc, tin, gold, silver, and a combination thereof.

The shield 1000 may have a substantially circular or oval shape. The plurality of conductive segments 1002a-n may extend radially outward from the location 1004.

The plurality of conductive segments 1002a-n may be separated from each other by a plurality of gaps 906a-n. More than one of the plurality of conductive segments 1002a-n, such as the conductive segments 1002b-e, may be connectable to an electrical ground of a charging device or a portable electronic device. The conductive segments 1002b-e may have a greater length than the remainder of the plurality of conductive segments 1002a-n. For example, the conductive segments 1002b-e may comprise additional conductive material connecting the conductive segments 1002b-e to an electrical ground of the wireless charging device or the portable electronic device. By connecting more than one of the plurality of conductive segments 1002a-n to an electrical ground, the voltage cross the location 1004 may be reduced, thereby mitigating eddy current losses.

Each conductive segment of the plurality of conductive segments 1002a-n may comprise a first portion having a first width and a first length and a second portion having a second width and a second length. The second length may be equal to a radius of the shield 1000 less the first length. The first portion may be closer than the second portion to the first location. The first width may be smaller than the second width.

The shield 1000 may be utilized in a system with a power coil (e.g. power coil 202), such as in the system 200 described above. For example, the shield 1000 may be positioned on a top or bottom surface of the power coil. A center of the power coil may comprise a circular opening having a radius. If the center of the power coil comprises a circular opening having a radius, the location 1004 may comprise a conductive point (e.g. filled circular point or conductive ring) positioned within the circular opening when the shield 1000 is positioned on a surface of the power coil.

The length of the first portion of the plurality of conductive segments 1002a-n may be substantially equal to a radius of the circular opening so that the first portion of each conductive segment of the plurality of conductive segments 1002a-n is not shielding the power coil. The smaller width of the first portion of the plurality of conductive segments 1002a-n reduces the surface area of the portion of the shield 1000 that is not actually shielding the power coil but is still exposed to the magnetic field generated by the power coil (e.g. magnetic field 402). By reducing the surface area of the portion of the shield 1000 that is not shielding the power coil but is still exposed to the magnetic field, eddy current losses are mitigated.

A width of the plurality of gaps 1006a-n may be less than a width of the plurality of conductive segments 1002a-n, so that each of the plurality of conductive segments 1002a-n are wider than each of the plurality of gaps 1006a-n. For example, a width of the plurality of gaps 1006a-n may be less than a width of the second portion of the plurality of conductive segments 1002a-n, such as a width of the second portion 1008b of the conductive segment 1002c.

Figure 11A:
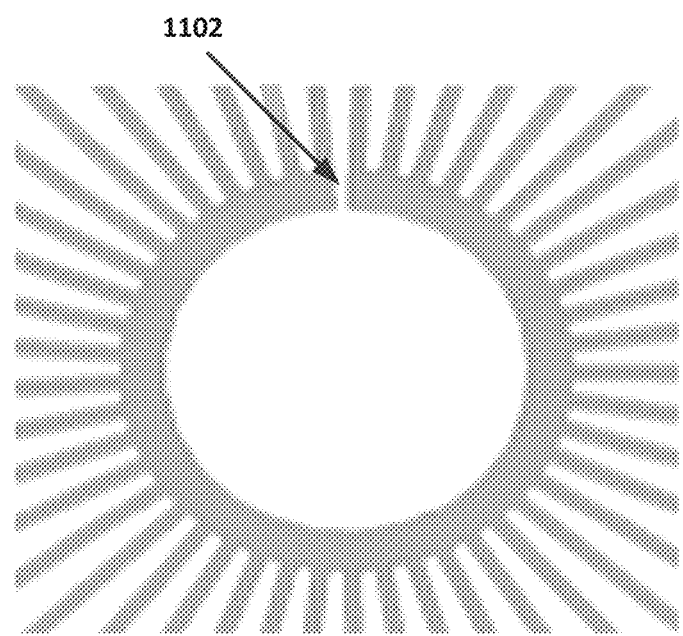
FIG. 11a illustrates a common voltage point, in accordance with an aspect of the disclosure.
Figure 11B:
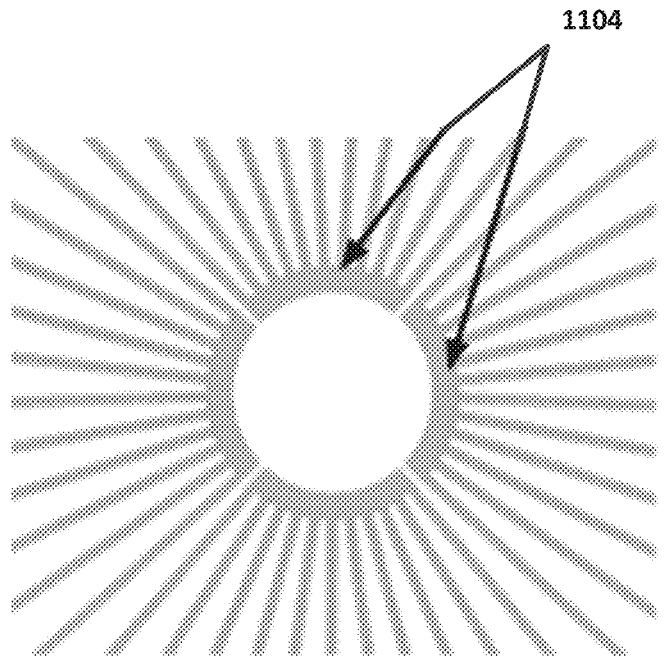
FIG. 11b illustrates another common voltage point, in accordance with an aspect of the disclosure.

FIGS. 11a-b illustrate different embodiments 1102, 1104 of a location on a shield (e.g. shield 100, 800, 900, and/or 1000) from which a plurality of conductive segments extend. For example, the locations 1102 and/or 1104 may be the location 104, 804, 904, and/or 1004.

The location 1102 is a conductive ring. The conductive ring 1102 may comprise a material selected from copper, aluminum, lead, zinc, tin, gold, silver, and a combination thereof. The conductive ring 1102 may be segmented. For example, a perimeter of the conductive ring 1102 may comprise a gap. The gap may be configured to break eddy current loops.

The location 1104 is another conductive ring. The conductive ring 1104 may comprise a material selected from copper, aluminum, lead, zinc, tin, gold, silver, and a combination thereof. The conductive ring 1104 may be segmented. For example, a perimeter of the conductive ring 1102 may comprise a plurality of gaps. The plurality of gaps may be configured to break eddy current loops. By increasing the number of gaps in the perimeter of the conductive ring 1104, the voltage across the location 1104 may be reduced.

Figure 12:
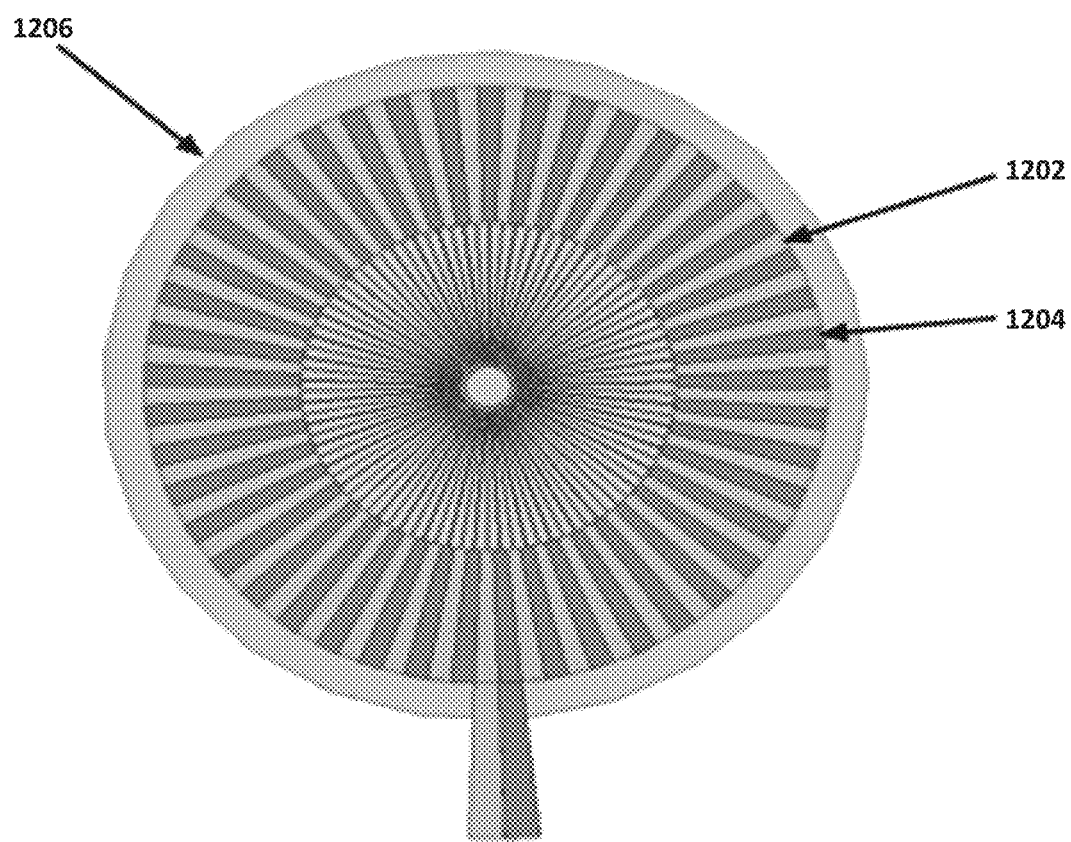
FIG. 12 illustrates a system including overlapping shields and a base, in accordance with an aspect of the disclosure.

FIG. 12 illustrates a system 1200 comprising overlapping shields. The system 1200 may comprises a pair of shields, such as a pair of the shields 100, 800, 900, or 1000. The first shield 1202 may be positioned on a bottom surface of a transmitter power coil, such as a transmitter power coil in a wireless charging device. The second shield 1204 may be positioned on a top surface of a receiver power coil, such as a receiver power coil in a portable electronic device. The first and second shields 1202, 1204 may be configured so that they are both positioned between the receiver power coil and the transmitted power coil when the portable wireless device is receiving power from (e.g. placed on top of) the wireless charging device. Insulation material may be interposed between the first and second shields 1202, 1204.

The system 1200 may include a base 1206. The base 1206 may be a material comprising ferrite. The base 1206 may be positioned on a top surface of the transmitter power coil or a bottom surface of a receiver power coil. The diameter of the base 1206 may be larger than the diameter of the first shield 1202 and the second shield 1204.

When the portable wireless device is configured to receive power from (e.g. placed on top of) the wireless charging device, the first plurality of gaps may be configured to at least partially align (e.g. overlap) with the second plurality of conductive segments. Likewise, the second plurality of gaps may be configured to at least partially align (e.g. overlap) with the first plurality of conductive segments. The first plurality of conductive segments may have a greater width than the second plurality of gaps does. Likewise, the second plurality of conductive segments may have a greater width than the first plurality of gaps does. Such a configuration ensures that both the receiver and transmitter power coils are fully shielded.

Figure 13:
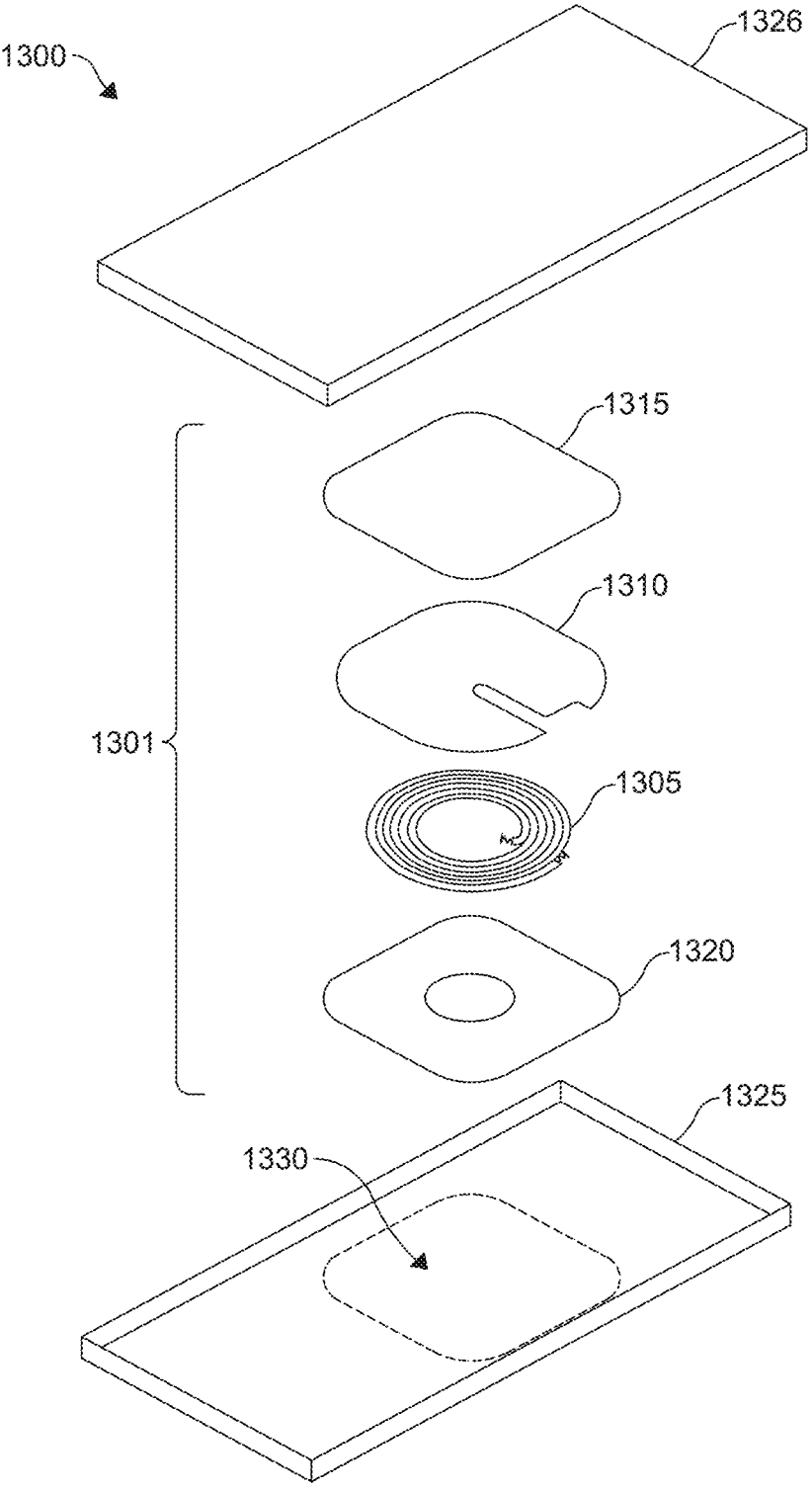
FIG. 13 illustrates a simplified diagram of an exploded view of a portable electronic device, in accordance with an aspect of the disclosure.

FIG. 13 illustrates an exploded view of a device 1300 including a power coil 1305. The device 1300 may be, for example, a portable electronic device or a wireless charging device. The device 1300 can include a top housing 1326 and a housing 1325 that can mate to define an interior cavity. As shown in FIG. 13, the device 1300 may include an electromagnetic shield 1306 and a ferromagnetic shield 1310.

The electromagnetic shield 1306 may, for example, be any one of the shields described above, such as the shield 100, the shield 800, the shield 900, or the shield 1000.

The electromagnetic shield 1306 may be positioned on a top or bottom surface of the power coil 1305 so that magnetic flux first passes through electromagnetic shield 1306 before reaching the power coil 1305 when the power coil 1305 operates as a receiver coil, or so that magnetic flux is directed toward the electromagnetic shield 1306 when the power coil 1305 operates as a transmitter coil. For instance, the electromagnetic shield 1306 may be positioned between the power coil 1305 and housing 1325. In some embodiments, the electromagnetic shield 1306 may be a shielding layer that is substantially transparent to magnetic flux so that a large percentage of magnetic flux can pass through it, but also be substantially opaque to electric field such that electric field generated by the power coil 1305 during operation is substantially blocked by it. Voltage generated in the electromagnetic shield 1306 by blocking the electric fields can be discharged to ground. Blocking electric fields mitigates noise stemming from a buildup of voltage on the power coil 1305. In some embodiments, the electromagnetic shield 1306 is formed of any material suitable for blocking electric fields while allowing electromagnetic fields to pass through, such as a thin layer of silver.

In one embodiment, the ferromagnetic shield 1310 may be positioned between the power coil 1305 and the thermal shield 1315. In some embodiments, the ferromagnetic shield 1310 acts as a magnetic field shield for redirecting magnetic flux to get higher coupling with a transmitter coil in a wireless charging device, which may result in improved charging efficiency. The ferromagnetic shield 1310 may also redirect magnetic flux to prevent stray flux from interfering with sensitive internal components within the device 1300.

The device 1300 may optionally include a thermal shield 1315. The thermal shield 1315 may include a graphite or similar layer that provides thermal isolation between wireless power receiving/transmitting module 1301 and the battery and other components of the device 1300 in which the wireless power receiving/transmitting module 301 is incorporated. The thermal shield 1315 may also include a copper layer that is tied to ground and contributes to the thermal shielding while also capturing stray flux.

The device 1300 may optionally include an adhesive component 1320 that attaches wireless power receiving/transmitting module 1301 to housing 1325. The adhesive component 1320 may be a single sheet of an adhesive material, such as pressure sensitive adhesive (PSA), that attaches wireless power receiving/transmitting module 1301 to housing 1325. In some embodiments, wireless power receiving/transmitting module 1301 is attached to housing 1325 within a cutout area 1330 sized and shaped to receive the wireless power receiving/transmitting module 1301, thereby permitting electronic magnetic signals to traverse housing 1325. In some embodiments, housing is a dielectric such as plastic and/or glass, and as such, optional cutout 1330 is not required. Instead of being attached to housing

1325 with a single sheet of adhesive material, wireless power receiving/transmitting module 1301 may be attached to housing 1325 with an attachment assembly that is composed of more than one sheet of adhesive material.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for electrostatic shielding, the system comprising:

a first shield comprising a first plurality of conductive segments extending from a first location, wherein the first plurality of conductive segments are separated from each other by a first plurality of gaps;

a second shield comprising a second plurality of conductive segments extending from a second location, wherein the second plurality of conductive segments are separated from each other by a second plurality of gaps; and an insulator interposed between the first shield and the second shield, wherein the first plurality of gaps are configured to at least partially align with the second plurality of conductive segments and the second plurality of gaps are configured to at least partially align with the first plurality of conductive segments.

2. The system of claim 1, wherein the first location comprises a conductive center point of the first shield or the second location comprises a conductive center point of the second shield.

3. The system of claim 2, wherein the conductive center point is filled.

4. The system of claim 1, wherein the first location comprises a conductive ring positioned in a center of the first shield or the second location comprises a conductive ring positioned in a center of the second shield.

5. The system of claim 1, wherein the first plurality of conductive segments extend radially outward from the first location or the second plurality of conductive segments extend radially outward from the second location.

6. The system of claim 1, wherein a width associated with the first plurality of conductive segments is greater than a width associated with the second plurality of gaps or a width associated with the second plurality of conductive segments is greater than a width associated with the first plurality of gaps.

7. The system of claim 1, wherein each conductive segment of the first plurality of conductive segments comprises a first portion having a first width and a first length and a second portion having a second width and a second length, the first portion being closer than the second portion to the first location, the first width being smaller than the second width, and the second length is equal to a radius of the first shield less the first length.

8. The system of claim 1, wherein each conductive segment of the second plurality of conductive segments comprises a first portion having a first width and a first length and a second portion having a second width and a second length, the first portion being closer than the second portion to the second location, the first width being smaller than the second width, and the second length is equal to a radius of the second shield less the first length.

9. The system of claim 1, wherein the first plurality of conductive segments or the second plurality of conductive segments is a material selected from copper, aluminum, lead, zinc, tin, gold, silver, and a combination thereof.

\* \* \* \* \*